US012631565B2

(12) United States Patent
Hwang

(10) Patent No.: US 12,631,565 B2
(45) Date of Patent: May 19, 2026

---

(54) SECONDARY BATTERY HAVING LEAD FILM INCLUDING LUMINOUS MATERIAL AND METHOD OF INSPECTING DEFECTS OF SECONDARY BATTERY

(71) Applicant: LG Chem, Ltd., Seoul (KR)

(72) Inventor: Jo Yeon Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1231 days.

(21) Appl. No.: 16/764,605

(22) PCT Filed: Aug. 1, 2019

(86) PCT No.: PCT/KR2019/009620
§ 371 (c)(1),
(2) Date: May 15, 2020

(87) PCT Pub. No.: WO2020/032480
PCT Pub. Date: Feb. 13, 2020

(65) Prior Publication Data
US 2020/0395642 A1      Dec. 17, 2020

(30) Foreign Application Priority Data

Aug. 8, 2018    (KR) ........................ 10-2018-0092270

(51) Int. Cl.
*H01M 50/10*          (2021.01)
*C09K 11/06*          (2006.01)
(Continued)

(52) U.S. Cl.
CPC .............. *G01N 21/88* (2013.01); *C09K 11/06* (2013.01); *G01N 21/64* (2013.01);
(Continued)

(58) Field of Classification Search
None
See application file for complete search history.

(56) References Cited

U.S. PATENT DOCUMENTS

| | | | |
|---|---|---|---|
| 4,122,376 A | 10/1978 | Mera et al. | |
| 2006/0134511 A1 | 6/2006 | Ito et al. | |

(Continued)

FOREIGN PATENT DOCUMENTS

| | | | |
|---|---|---|---|
| CN | 1794512 A | 6/2006 | |
| CN | 202691734 * | 1/2013 | ............... F21S 4/00 |

(Continued)

OTHER PUBLICATIONS

Search Report dated Dec. 27, 2021 from Office Action for Chinese Application No. 201980005476.5 dated Jan. 5, 2022. 3 pgs.

(Continued)

*Primary Examiner* — Barbara L Gilliam
*Assistant Examiner* — Angela J Martin
(74) *Attorney, Agent, or Firm* — Lerner David LLP

(57)          ABSTRACT

A secondary battery includes an electrode assembly configured to have a structure in which a separator is interposed between a positive electrode and a negative electrode, a battery case having formed therein a receiving portion configured to receive the electrode assembly, electrode leads configured to protrude outwards from the battery case, and lead films attached to opposite surfaces of each of the electrode leads, wherein each of the lead films includes a luminous material.

13 Claims, 5 Drawing Sheets

100

(51) Int. Cl.

| | |
|---|---|
| *G01N 21/64* | (2006.01) |
| *G01N 21/88* | (2006.01) |
| *H01M 10/48* | (2006.01) |
| *H01M 50/105* | (2021.01) |
| *H01M 50/178* | (2021.01) |
| *H01M 50/186* | (2021.01) |
| *H01M 50/19* | (2021.01) |
| *H01M 50/193* | (2021.01) |
| *H01M 50/55* | (2021.01) |

(52) U.S. Cl.
CPC ....... *H01M 10/488* (2013.01); *H01M 50/105* (2021.01); *H01M 50/178* (2021.01); *H01M 50/186* (2021.01); *H01M 50/193* (2021.01); *H01M 50/55* (2021.01)

(56) References Cited

U.S. PATENT DOCUMENTS

| | | | |
|---|---|---|---|
| 2011/0255303 A1 * | 10/2011 | Nichol | G02B 6/0088 |
| | | | 362/606 |
| 2012/0203321 A1 | 8/2012 | Moffitt et al. | |
| 2016/0248032 A1 * | 8/2016 | Seo | H10K 50/13 |
| 2016/0261010 A1 | 9/2016 | Kwon et al. | |

FOREIGN PATENT DOCUMENTS

| | | | |
|---|---|---|---|
| JP | S5575065 U | 5/1980 | |
| JP | 859139551 A | 8/1984 | |
| JP | H0982309 * | 3/1997 | ............ H01M 2/30 |
| JP | 2002245988 A | 8/2002 | |
| JP | 2003123710 A | 4/2003 | |
| JP | 2003272598 A | 9/2003 | |
| JP | 2004247141 A | 9/2004 | |
| JP | 2007-095467 * | 4/2007 | ........... H01M 10/05 |
| JP | 2007095467 A | 4/2007 | |
| JP | 4899313 B2 | 3/2012 | |
| JP | 3178499 U | 9/2012 | |
| JP | 2014208729 A | 11/2014 | |
| JP | 2016091939 A | 5/2016 | |
| JP | 2017016975 A | 1/2017 | |
| KR | 20060023472 A | 3/2006 | |
| KR | 100601530 B1 | 7/2006 | |
| KR | 100709835 B1 | 4/2007 | |
| KR | 101240568 B1 | 3/2013 | |
| KR | 101354132 B1 | 2/2014 | |
| KR | 101540857 B1 | 7/2015 | |
| KR | 20160107973 A | 9/2016 | |
| KR | 20170004686 A | 1/2017 | |
| WO | 2018110702 A1 | 6/2018 | |
| WO | WO 2018-110702 * | 6/2018 | ............ B32B 15/09 |

OTHER PUBLICATIONS

International Search Report from Application No. PCT/KR2019/009620 mailed Oct. 31, 2019, 2 pages.
Extended European Search Report for Application No. 19848373.7, dated Aug. 25, 2021, 6 pages.

* cited by examiner

<u>100</u>

<u>200</u>

SECONDARY BATTERY HAVING LEAD FILM INCLUDING LUMINOUS MATERIAL AND METHOD OF INSPECTING DEFECTS OF SECONDARY BATTERY

CROSS-REFERENCE TO RELATED APPLICATIONS

This application is a national phase entry under 35 U.S.C. § 371 of International Application No. PCT/KR2019/009620, filed Aug. 1, 2019, published in Korean, which claims the benefit of priority to Korean Patent Application No. 10-2018-0092270 filed on Aug. 8, 2018, the disclosures of which are incorporated herein by reference in their entirety.

TECHNICAL FIELD

The present invention relates to a secondary battery having a lead film including a luminous material and a method of inspecting defects of the secondary battery, and more particularly to a secondary battery configured such that, after the secondary battery is manufactured by attaching lead films, each of which includes a luminous material, to the upper and lower surfaces of an electrode lead, the attached state of the lead films is confirmed through light irradiation in order to inspect defects of the secondary battery.

BACKGROUND ART

Based on the shape of a battery case, secondary batteries are classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

Among these secondary batteries, the pouch-shaped battery, which can be stacked with high integration, has high energy density per unit weight, is inexpensive, and can be easily modified, has attracted considerable attention.

The pouch-shaped secondary battery includes an electrode assembly, electrode tabs extending from the electrode assembly, an electrode lead welded to the electrode tabs, and a battery case configured to receive the electrode assembly.

The battery case may include an upper case and a lower case. When the portions of the upper case and the lower case in the direction in which the electrode tabs protrude are thermally fused to each other, a lead film is attached between the electrode lead and the outer edge sealed portion of the battery case in order to prevent the occurrence of short circuit between the electrode lead and the battery case and to secure sealing force of the battery case.

A conventional representative pouch-shaped secondary battery is configured so as to include an electrode assembly, electrode tabs extending from the electrode assembly, an electrode lead welded to the electrode tabs, and a battery case configured to receive the electrode assembly.

The electrode assembly is a power-generating element configured such that a positive electrode and a negative electrode are sequentially stacked in the state in which a separator is interposed therebetween, and is configured to have a stacked type structure or a stacked/folded type structure. The electrode tabs extend from respective electrode plates of the electrode assembly, and the electrode lead is electrically connected to the plurality of electrode tabs extending from the respective electrode plates, for example, by welding, wherein a portion of the electrode lead is exposed outwards from the battery case. An insulative film is attached to a portion of each of the upper and lower surfaces of the electrode lead in order to improve the seal with the battery case and at the same time to ensure an electrically insulated state.

The lead film is constructed using one or more selected from among polyimide (PI), polypropylene (PP), polyethylene (PE), polyethylene terephthalate (PET), and polyvinyl chloride (PVC), and the lead film is bonded to an inner layer of the battery case by thermal fusion using heat and pressure.

The lead film is attached to the battery case so as to protrude outwards from the battery case in order to prevent the occurrence of short circuit between the electrode lead and a metal layer of the pouch-shaped case, e.g. an aluminum sheet, and to increase the sealing force of the pouch-shaped case and thus to prevent leakage of an electrolytic solution and the like.

In the case in which bonding of the lead film is not uniform, the lower end of the lead film located in a receiving portion is rolled or bent due to the radiant/conductive heat generated during sealing of the outer edge of the battery case, whereby the battery case is dented, or the electrode lead directly contacts the aluminum sheet in the battery case. As a result, serious problems, such as deterioration of insulation due to a decrease in insulation resistance, occurrence of short circuit, or corrosion, are caused.

Particularly, in the case in which the negative electrode contacts the battery case, moisture permeation and swelling may occur due to a change in physical properties of the aluminum pouch.

In addition, the thermally fused portion of the pouch has low resistance to permeation of external moisture. As a result, it is not possible to avoid moisture permeation in the long run, and the permeated moisture reacts with negative ions of $LiPF_6$ included in the electrolytic solution to produce HF, which leads to deterioration of a negative electrode active material.

Korean Registered Patent Publication No. 1240568 (2013.02.28) discloses a high heat-resistance insulative film configured such that glass fiber, pulverized in the units of several tens or several hundreds of micrometers, is added to an adhesive layer of the insulative film that is adhered to a metal of an electrode terminal in order to remove directivity of strength and to improve surface smoothness, thereby greatly improving heat resistance, wear resistance, and dimensional stability. In Korean Registered Patent Publication No. 1240568, even when moisture permeation occurs, the insulative film is securely supported, whereby electrical insulation is maintained. In the case in which rolling of or damage to the lower end of a lead film due to heat during sealing of the outer edge of a battery case is not confirmed, however, moisture permeation is not avoidable, whereby an electrical insulation effect is limited.

Korean Registered Patent Publication No. 1540857 (2015.07.24) discloses a polymer film for a lead tab of a secondary battery including a main layer, a skin layer formed on one surface or opposite surfaces of the main layer, and a coating layer formed on the skin layer, the coating layer including an acidic reactant. In Korean Registered Patent Publication No. 1540857, when an electrolytic solution leaks from a gap between an electrode terminal and the polymer film, the acidic reactant included in the coating layer of the polymer film reacts with hydrofluoric acid produced as the result of contact between the electrolytic solution and air and moisture, whereby the acidic reactant is discolored, and therefore it is possible to directly confirm leakage of the electrolytic solution with the naked eye during manufacture or use thereof. In the case in which a lead film does not protrude outwards from a battery case, however, it is not possible to confirm whether the lead film is discolored, whereby it is difficult to distinguish a defective battery cell.

Korean Registered Patent Publication No. 0601530 (2006.07.07) discloses a lithium ion secondary battery configured such that a fluorescence color layer including a fluorescent material is included in at least one layer of a label attached to the outer surface of a bare cell. However, it is an object thereof to confirm whether the lithium ion secondary battery is genuine, and the fluorescence color layer is attached to a battery case, rather than an electrode film and a lead film.

Korean Patent Application Publication No. 2016-0107973 (2016.09.19) discloses a construction in which a fluorescent coating portion is applied to a portion of a case of a secondary battery. However, it is an object thereof to confirm the outflow state of an electrolytic solution, and the fluorescent coating portion is applied between a cap plate and an opening of the case.

As discussed above, these four patent documents are limited in solving problems with the secondary battery due to defective adhesion of the lead film, such as deterioration of insulation, occurrence of short circuit, or corrosion, and therefore there is a high necessity for technology capable of confirming the defects of the secondary battery depending on the attached state of the lead film and the protruding extent thereof.

DISCLOSURE

Technical Problem

It is an object of the present invention to confirm the attached state of a lead film protruding outwards from a secondary battery with the naked eye, thereby ensuring insulation of the secondary battery, reducing a defect rate of finished products, and thus improving product reliability.

Technical Solution

In order to solve the above problems, a pouch-shaped secondary battery according to an embodiment of the present invention includes:

an electrode assembly configured to have a structure in which a separator is interposed between a positive electrode and a negative electrode;

a battery case having formed therein a receiving portion configured to receive the electrode assembly;

electrode leads configured to protrude outwards from the battery case; and lead films attached to opposite surfaces of each of the electrode leads, wherein each of the lead films includes a luminous material.

The luminous material may exhibit fluorescence by light irradiation.

The light irradiation may be irradiation with ultraviolet light or blue light.

Each of the lead films may be configured to have a structure in which a lead film body and the luminous material are integrally formed.

Each of the lead films may be configured to have a structure including a lead film body and a luminous layer formed at the outer surface of the lead film body.

The luminous material may include one or more of an aqueous or solvent-based fluorescent dye, a sulfide-based fluorescent pigment, an oxysalt-based fluorescent pigment, or a phosphorescent pigment.

The luminous material may include one or more of a coumarin-based luminous material, a naphthalimide-based luminous material, a quinacridone-based luminous material, a cyanine-based luminous material, a xanthine-based luminous material, a pyridine-based luminous material, a low molecular weight luminous material, a high molecular weight luminous material, an inorganic-based luminous material, or a combination thereof.

Each of the lead films may include two or more luminous materials configured to emit different colors of light.

The electrode leads may include a positive electrode lead and a negative electrode lead, and each of the lead films attached to the positive electrode lead and the negative electrode lead may include two or more luminous materials configured to emit different colors of light.

Each of the lead films may include two or more luminous materials configured to emit different colors of light every predetermined length.

A protective layer may be further added to the outer surface of each of the lead films.

The present invention also provides a method of inspecting defects of a secondary battery.

Specifically, the method of inspecting defects of the secondary battery includes:

(a) a step of irradiating the secondary battery with light; and (b) a step of visually confirming whether a portion of the lead film fluoresces to determine whether the secondary battery is defective.

The present invention also provides a battery pack including the secondary battery.

The battery pack may be used as a power source for a device requiring the ability to withstand high temperature, a long lifespan, high rate characteristics, etc. Specific examples of the device may include a mobile electronic device, a wearable electronic device, a power tool driven by a battery-powered motor; an electric automobile, such as an electric vehicle (EV), a hybrid electric vehicle (HEV), or a plug-in hybrid electric vehicle (PHEV); an electric two-wheeled vehicle, such as an electric bicycle (E-bike) or an electric scooter (E-scooter); an electric golf cart; and an energy storage system. However, the present invention is not limited thereto.

The structure and manufacturing method of the device are well known in the art to which the present invention pertains, and thus a detailed description thereof will be omitted.

BEST MODE

Figure 1:
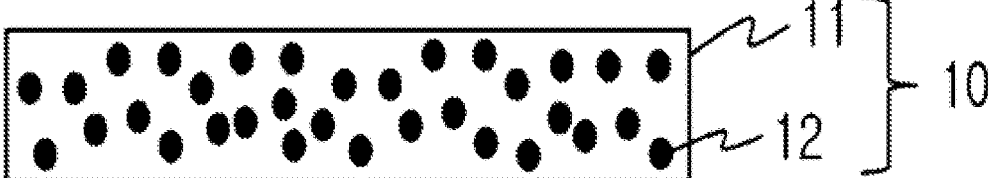
FIG. 1 is a vertical sectional view showing a lead film according to an embodiment of the present invention.

A secondary battery according to an embodiment of the present invention includes an electrode assembly configured to have a structure in which a separator is interposed between a positive electrode and a negative electrode, a battery case having formed therein a receiving portion configured to receive the electrode assembly, electrode leads configured to protrude outwards from the battery case, and lead films attached to opposite surfaces of each of the electrode leads, wherein each of the lead films includes a luminous material.

The structure of the electrode assembly is not particularly restricted. For example, the electrode assembly may be configured to have a stacked type structure, a jelly-roll type structure, a stacked/folded type structure, or a laminated/stacked type structure.

A laminate sheet constituting the battery case may be configured to have a structure including a first resin layer, which defines the inner surface of a main body of the battery case, a second resin layer, which defines the outer surface of the main body, and a metal layer, which is interposed between the first resin layer and the second resin layer.

The battery case is made of an aluminum laminate sheet, provides a space in which the electrode assembly is received, and generally has a pouch shape. The battery case is configured such that an outer resin layer, which is made of nylon or polyethylene terephthalate, is located outside a metal barrier layer, which is configured to prevent moisture permeation, and an inner resin layer, which is made of a polypropylene material and at which the battery case is thermally fused, is located inside the metal barrier layer.

The metal layer serves to prevent air, moisture, and the like from being introduced into the battery, and serves to securely support the battery case against physical force that may be generated inside and outside the battery during use or movement of the battery. The metal layer may be made of a metallic material, such as aluminum, an aluminum alloy, copper, a copper alloy, nickel, a nickel alloy, or stainless steel.

The first resin layer faces the surface of the battery case in which the electrode assembly and an electrolytic solution are received. For this reason, the first resin layer must be made of an insulative material capable of maintaining the state thereof insulated from the battery case during operation of the battery. In addition, durability of the first resin layer is required so as not to be torn or peeled off even when reacting with the electrolytic solution or contacting the electrode assembly.

The second resin layer serves to protect the battery from the outside. For this reason, the second resin layer must have high tensile strength and durability so as not to be easily peeled off or torn by external physical force such that the metal layer located inside the second resin layer is not exposed.

The first resin layer and the second resin layer may be made of the same material or different materials. Since the laminate sheet is sealed by thermal fusion, the first resin layer is made of a material that is melted and fused when pressed at high temperature.

The lead film is constructed using one or more selected from the group consisting of polyimide (PI), polypropylene (PP), polyethylene (PE), polyethylene terephthalate (PET), polyvinyl chloride (PVC), high density polyethylene (HDPE), and an epoxy resin, and is bonded to the inner layer of the battery case by thermal fusion using heat and pressure.

The kind of the luminous material is not particularly restricted as long as the luminous material is a material that is excited by ultraviolet light and blue light to emit light having a wavelength band that can be discriminated with the naked eye. Preferably, however, a heat-resistant material that is not damaged at a temperature of at least 100° C. or more so as not to be deteriorated in the thermal fusing process during manufacture of the secondary battery is used as the luminous material.

The luminous material may be one or more selected from the group consisting of an aqueous or solvent-based fluorescent dye, a sulfide-based fluorescent pigment, an oxysalt-based fluorescent pigment, and a phosphorescent pigment.

In addition, the luminous material may be one or more selected from the group consisting of a coumarin-based luminous material, a naphthalimide-based luminous material, a quinacridone-based luminous material, a cyanine-based luminous material, a xanthine-based luminous material, a pyridine-based luminous material, a low molecular weight luminous material, a high molecular weight luminous material, an inorganic-based luminous material, and a combination thereof.

Specifically, the luminous material may be one or more selected from the group consisting of a coumarin-based luminous material including 3-(2-benzothiazolyl)-7-diethyl-amino coumarin (coumarin 6), 3-(2-benzimidazolyl)-7-di-ethylamino coumarin (coumarin 7), and coumarin 135; a naphthalimide-based luminous material including solvent yellow 43 and solvent yellow 44; a quinacridone-based luminous material such as diethyl quinacridone (DEQ); a cyanine-based luminous material including 4-dicyanometh-ylene-2-methyl-6-(p-dimethylaminostyryl)-4H-pyran (DCM-1(I)), DCM-2(II), and DCJTB(III); a xanthine-based luminous material including rhodamine B and rhodamine 6G; a pyridine-based luminous material including pyridine 1; a low molecular weight luminous material such as 4,4-difluoro-1,3,5,7-tetraphenyl-4-bora-3a,4a-diaza-s-indacene (IV), lumogen F red, and nile red (V); a high molecular weight luminous material including polyphenylene, pol-yarylene, and polyfluorene; an inorganic-based luminous material such as $Sr(PO2)Cl:Eu$ emitting blue light, $Zn2GeO2:Mn$ emitting green light, and $Y2O2S:Eu$ emitting red light; and a combination thereof.

In addition, a rare-earth element, which is a nonmetal material including no conductive metal, may be used as the luminous material in order to secure insulation of the secondary battery, and thulium (Tm), neodymium (Nd), ytterbium (Yb), and gadolinium (Gd) may be included.

The lead film may be configured to have a structure in which a lead film body and the luminous material are integrally formed. Specifically, at the time of manufacturing the lead film, the luminous material is distributed in a lead film composition in order to form the lead film.

In addition, the lead film may be configured to have a structure including a lead film body and a luminous layer formed at the outer surface of the lead film body. The lead film body means a conventional lead film. Specifically, the luminous material is coated or sprayed on the surface of the lead film body, or a film including the luminous material is attached to the outer surface of the lead film body in order to form a luminous layer formed at the outer surface of the lead film body.

A protective layer is further added to the outer surface of the lead film or the luminous layer.

The protective layer serves to prevent the luminous material from being separated from the lead film or to prevent the luminous layer from being damaged. Since the protective layer allows the lead film to be uniformly luminescent, it is possible to minimize errors in inspecting defects of the secondary battery.

In addition, the protective layer serves to increase the strength of the lead film, thereby preventing the lead film from being rolled or wrinkled at the time of thermal fusion.

The protective layer may be made of a material that is capable of absorbing light without reflecting the light such that the light is incident on the luminous layer and thus the luminous layer can fluoresce.

The protective layer is bonded to the inner layer of the battery case by thermal fusion using heat and pressure. In order to secure insulation and sealability with the battery case, the protective layer may be made of one or a mixture of two or more selected from the group consisting of polyimide (PI), polypropylene (PP), polyethylene (PE), polyethylene terephthalate (PET), polyvinyl chloride (PVC), high density polyethylene (HDPE), and an epoxy resin, in the same manner as the lead film.

In the case in which the lead film is configured to have a multilayer structure including a lead film body, a luminous layer, and a protective layer, adhesive layers may be formed and adhered between the lead film body and the luminous layer and between the luminous layer and the protective layer. Alternatively, the lead film may be configured to have a multilayer structure in which a plurality of layers is formed in the shape of a film through pneumatic protrusion so as to be directly adhered to each other without separate adhesive layers.

The lead film is configured to have a structure including two or more kinds of luminous materials that emit different colors of light. Specifically, the lead film may include a first luminous portion configured to emit green light, a second luminous portion configured to emit red light, and a third luminous portion configured to emit blue light.

The present invention also provides a method of inspecting defects of the secondary battery.

Specifically, the method of inspecting defects of the secondary battery may include:

(a) a step of applying a lead film configured to have a structure including a luminous material to manufacture a secondary battery;

(b) a step of irradiating the secondary battery manufactured at step (a) with light; and (c) a step of confirming a portion of the lead film that fluoresces with the naked eye to determine whether the secondary battery is defective.

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that the other elements may be further included unless mentioned otherwise.

Embodiments of the present invention will be described in detail with reference to the accompanying drawings.

Embodiment 1

FIG. 1 is a vertical sectional view showing a lead film according to an embodiment of the present invention.

Referring to FIG. 1, the lead film 10 according to this embodiment is configured to have a single-layer structure. Specifically, the lead film is configured to have a structure in which a lead film body 11 and a luminous material 12 are integrally formed.

Embodiment 2

Figure 2:
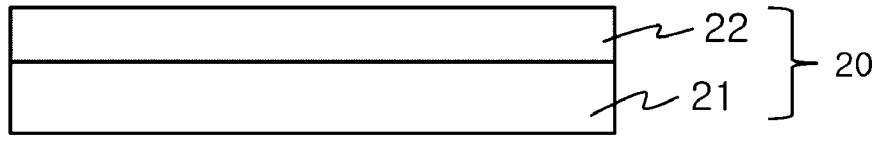
FIG. 2 is a vertical sectional view showing a lead film according to another embodiment of the present invention.

FIG. 2 is a vertical sectional view showing a lead film according to another embodiment of the present invention.

Referring to FIG. 2, the lead film 20 according to this embodiment is configured to have a two-layer structure in which a luminous layer 22 is formed on one surface of a lead film body 21. Preferably, therefore, when lead films are attached to opposite surfaces of an electrode lead, the lead film body is located so as to face the electrode lead, and the luminous layer is located so as to be attached to the other surface of the lead film body that faces the electrode lead.

Unlike what is shown in FIGS. 1 and 2, protective layers (not shown) may be selectively added to outer surfaces of the lead film 10 and the luminous layer 22.

According to another embodiment of the present invention, a lead film includes two or more kinds of luminous materials configured to emit different colors of light. Specifically, the lead film includes a first luminous portion configured to emit green light, a second luminous portion configured to emit red light, and a third luminous portion configured to emit blue light. The luminous portion means a luminous material formed integrally with the lead film body or a luminous layer formed on the upper surface of the lead film body.

The first luminous portion, the second luminous portion, and the third luminous portion are not limited to the green light, the red light, and the blue light, respectively. The luminous portions may be configured to emit other different colors of light, such as yellow light or orange light, in addition to the green light, the red light, and the blue light. In addition, the luminous portions may be configured to emit a single color of light. In the case in which the luminous portions are configured to emit a single color of light, the luminous portions may have different degrees of brightness depending on the quantity of a luminous material.

Embodiment 3

Figure 3:
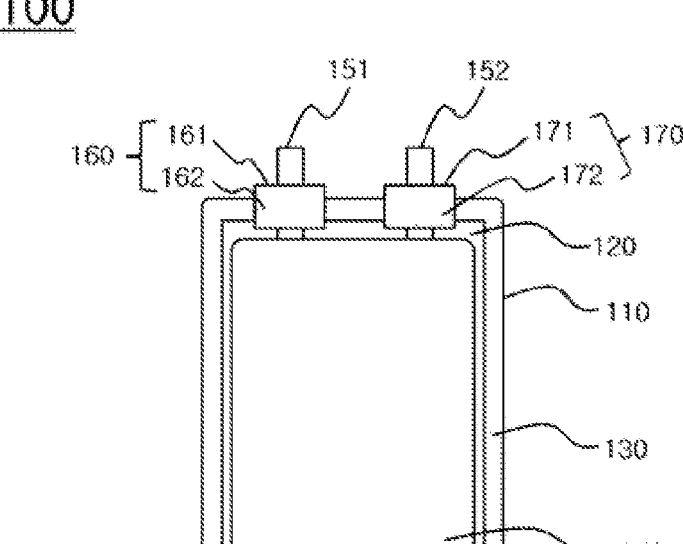
FIG. 3 is a plan view showing a secondary battery according to an embodiment of the present invention.

FIG. 3 is a plan view showing a secondary battery according to an embodiment of the present invention.

Referring to FIG. 3, an electrode assembly 140 is received in a receiving portion 120 formed in the central part of a pouch-shaped battery case 110. A positive electrode lead 151 and a negative electrode lead 152 are formed at the upper part of the electrode assembly 140. A lead film 160 including a first luminous portion 162 is attached to each of the upper and lower surfaces of the positive electrode lead 151, and a lead film 170 including a second luminous portion 172 is attached to each of the upper and lower surfaces of the negative electrode lead 152.

The lead films 160 and 170, which include luminous portions 162 and 172 configured to emit different colors of light, respectively, are attached to the positive electrode lead 151 and the negative electrode lead 152, respectively, whereby it is possible to distinguish between a positive electrode and a negative electrode based on the colors of light of the lead films 160 and 170. When a battery module or a battery pack including a plurality of battery cells is constructed, therefore, it is possible to easily distinguish between electrodes for series connection or parallel connection of the battery cells.

Embodiment 4

Figure 4:
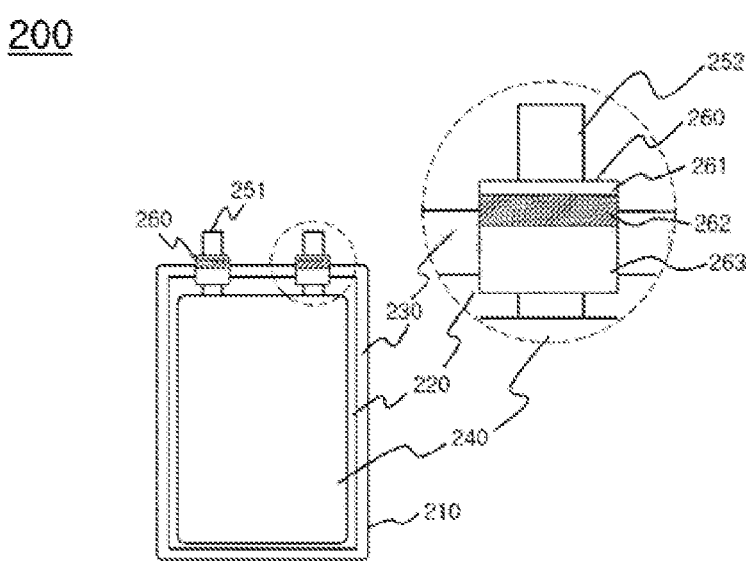
FIG. 4 is a plan view showing a secondary battery according to another embodiment of the present invention.

FIG. 4 is a plan view showing a secondary battery according to another embodiment of the present invention.

Referring to FIG. 4, a first luminous portion 261, a second luminous portion 262, and a third luminous portion 263, which are configured to emit different colors of light, are formed at a lead film 260.

Specifically, the first luminous portion 261, which is configured to emit green light, the second luminous portion 262, which is configured to emit red light, and the third luminous portion 263, which is configured to emit blue light, are formed from the protruding distal end of the lead film 260 toward a battery case 210. According to the above construction, it is possible to grasp the protruding length of the lead film 260 based on the region that is confirmed with the naked eye after a secondary battery is manufactured.

Specifically, it is preferable that 15% to 30% of the total length of the lead film 260 protrude and 50% or more not protrude. The first luminous portion 261 may be formed from the protruding distal end of the lead film 260 so as to reach a 15% point toward the battery case 210, and the second luminous portion 262 may be formed from the protruding distal end of the lead film 260 so as to be located between a 10% point and a 40% point toward the battery case 210.

In the case in which the lead film 260 is exposed outwards from the battery case 210 up to the part at which the second luminous portion 262 is formed, as shown in FIG. 4, there are no parts of the positive electrode lead 251 and the negative electrode lead 252 that directly contact the battery case 210 when the outer circumferential surface of the battery case is sealed. After the secondary battery is manufactured, therefore, it can be seen that the protruding length of the lead film 260 is within a normal range in the case in which the second luminous portion 262 is confirmed with the naked eye.

Figure 5:
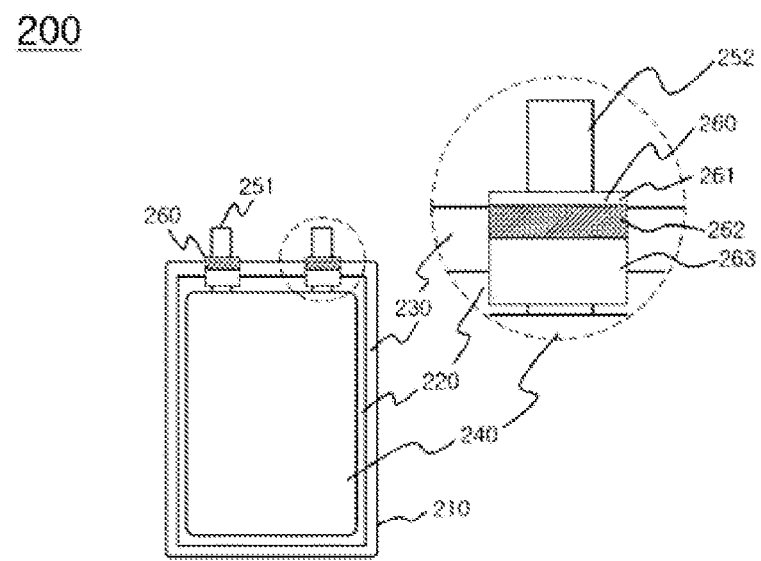
FIGS. 5 and 6 are plan views of a secondary battery showing examples in which attachment of a lead film is defective.
Figure 6:
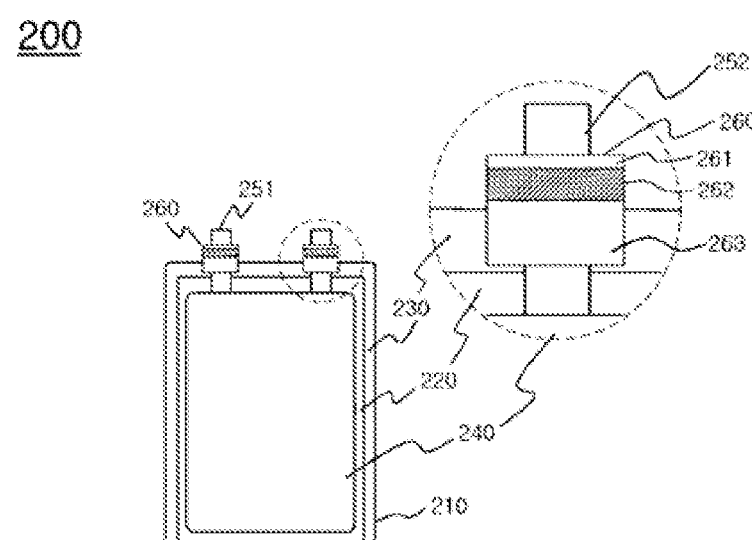

FIGS. 5 and 6 are plan views of the secondary battery showing examples in which attachment of the lead film is defective.

In the case in which the lead film 260 protrudes outwards from the battery case 210 up to the part at which the first luminous portion 261 is formed and the second luminous portion 262 does not protrude, as shown in FIG. 5, it can be seen that the protruding length is insufficient. In the above case, there are no parts of the positive electrode lead 251 and the negative electrode lead 252 that directly contact the battery case 210 when the outer circumferential surface of the battery case 210 is sealed, but the protruding length is too short, whereby the lead film may be rolled or bent during a thermal fusion sealing process.

In the case in which the lead film protrudes outwards from the battery case up to the part at which the third luminous portion is formed, as shown in FIG. 6, the negative electrode lead and the positive electrode lead directly contact the battery case, whereby problems, such as deterioration of insulation, occurrence of short circuit, or corrosion, may result. In the case in which even the third luminous portion is seen, therefore, the protruding length of the lead film is excessive, whereby it can be seen that the lead film is defective.

Although the preferred embodiments of the present invention have been described by way of illustration, the scope of the present invention is not limited to the specific embodiments described herein, and the present invention can be appropriately modified within the category described in the claims.

DESCRIPTION OF REFERENCE NUMERALS

10, 20, 160, 170, 260: Lead films
11, 21, 161, 171: Lead film bodies
12: Luminous material
22: Luminous layer
100, 200: Pouch-shaped secondary batteries
110, 210: Battery cases
120, 220: Receiving portions
130, 230: Sealed portions
140, 240: Electrode assemblies
150, 250: Electrode leads
151, 251: Positive electrode leads
152, 252: Negative electrode leads
162, 261: First luminous portions
172, 262: Second luminous portions
263: Third luminous portion

INDUSTRIAL APPLICABILITY

As is apparent from the above description, a pouch-shaped secondary battery according to an embodiment of the present invention is configured such that a protruding portion of a lead film fluoresces by light irradiation. Since the portion of the lead film that fluoresces is confirmed with the naked eye after the secondary battery is manufactured and thus the attached state of the lead film is easily confirmed, it is possible to secure insulation of the secondary battery and to easily sort defective products in advance, whereby it is possible to improve reliability.

In addition, lead films attached to a positive electrode lead and a negative electrode lead each include two or more luminous materials configured to emit different colors of light, whereby it is possible to distinguish between the positive electrode and the negative electrode based on the colors of light of the lead films. When a battery module or a battery pack including a plurality of battery cells is constructed, therefore, it is possible to easily distinguish between electrodes for series connection or parallel connection of the battery cells.

Each of the lead films includes two or more luminous materials configured to emit different colors of light every predetermined length. When confirming with the naked eye by light irradiation, it is possible to easily grasp the protruding length of each of the lead films based on luminous colors. That is, it is possible to easily grasp a range within which each of the lead films excessively protrudes outwards from a battery case or does not too little protrude outwards from the battery case with the naked eye.

A protective layer is further added to the outer surface of each of the lead films, whereby it is possible to prevent the luminous material from being separated from each of the lead films or to prevent a luminous layer from being damaged. Since each of the lead films is uniformly luminescent, it is possible to minimize errors in inspecting defects of the secondary battery. In addition, the protective layer increases the strength of each of the lead films, thereby preventing each of the lead films from being rolled or wrinkled at the time of thermal fusion.

In the pouch-shaped secondary battery according to the embodiment of the present invention, as described above, it is possible to easily confirm whether the lead films are attached to correct positions, whereby it is possible to improve insulation of the secondary battery and to accurately and rapidly determine defective products by light irradiation.

The invention claimed is:

1. A secondary battery comprising:
an electrode assembly configured to have a structure in which a separator is interposed between a positive electrode and a negative electrode;
a battery case having formed therein a receiving portion configured to receive the electrode assembly;
electrode leads configured to protrude outwards from the battery case; and
lead films attached to opposite surfaces of each of the electrode leads,
wherein each of the lead films comprises two or more luminous materials configured to emit different colors of light.

2. The secondary battery according to claim 1, wherein the luminous material exhibits fluorescence by light irradiation.

3. The secondary battery according to claim 2, wherein the light irradiation is irradiation with ultraviolet light or blue light.

4. The secondary battery according to claim 1, wherein each of the lead films is configured to have a structure in which a lead film body and the luminous material are integrally formed.

5. The secondary battery according to claim 4, wherein the luminous material is distributed in a composition of the lead film body.

6. The secondary battery according to claim 1, wherein each of the lead films is configured to have a structure comprising a lead film body and a luminous layer formed at an outer surface of the lead film body.

7. The secondary battery according to claim 1, wherein the luminous material includes one or more of an aqueous or solvent-based fluorescent dye, a sulfide-based fluorescent pigment, an oxysalt-based fluorescent pigment, or a phosphorescent pigment.

8. The secondary battery according to claim 1, wherein the luminous material includes one or more of a coumarin-based luminous material, a naphthalimide-based luminous material, a quinacridone-based luminous material, a cyanine-based luminous material, a xanthine-based luminous material, a pyridine-based luminous material, a low molecular weight luminous material, a high molecular weight luminous material, an inorganic-based luminous material, or a combination thereof.

9. The secondary battery according to claim 1, wherein the electrode leads comprise a positive electrode lead and a negative electrode lead, and each of the lead films attached to the positive electrode lead and the negative electrode lead comprises two or more luminous materials configured to emit different colors of light.

10. The secondary battery according to claim 1, wherein a protective layer is further added to an outer surface of each of the lead films.

11. The secondary battery according to claim 1, wherein the different colors of light comprise a first color of light and a second color of light, and
wherein the lead films attached to opposite surfaces of a first one of the electrode leads are configured to emit the first color of light, and the lead films attached to opposite surfaces of a second one of the electrode leads are configured to emit the second color of light.

12. The secondary battery according to claim 1, further comprising a protective layer added to the outer surface of the lead film,
wherein the protective layer is made of a material that is capable of absorbing light without reflecting the light such that the light is incident on the luminous layer.

13. A method of inspecting defects of the secondary battery according to claim 1, the method comprising:
(a) irradiating the secondary battery with light; and
(b) visually confirming whether a portion of the lead film fluoresces to determine whether the secondary battery is defective.

* * * * *